T. CONSENTINO.
FIREARM.
APPLICATION FILED MAR. 7, 1910.
987,672.
Patented Mar. 21, 1911.
4 SHEETS—SHEET 1.
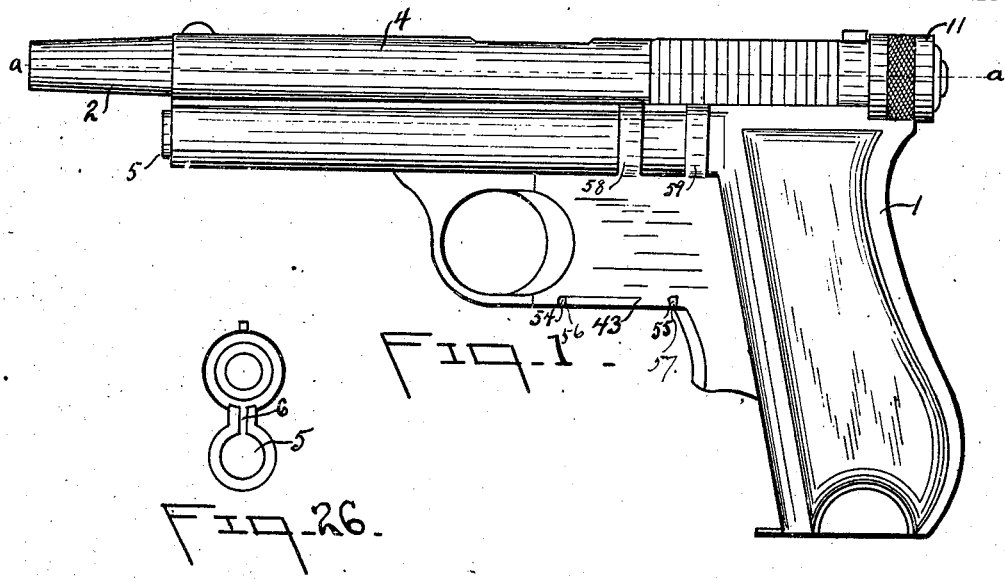
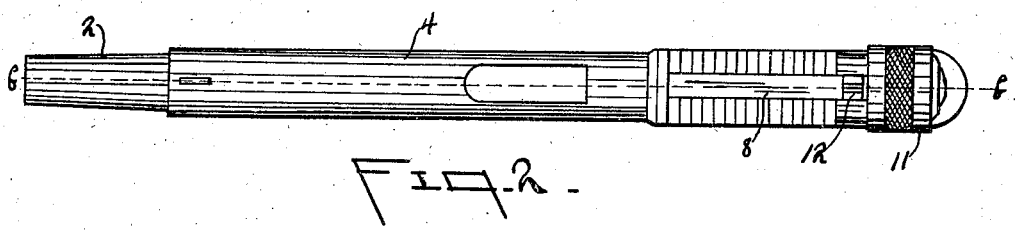
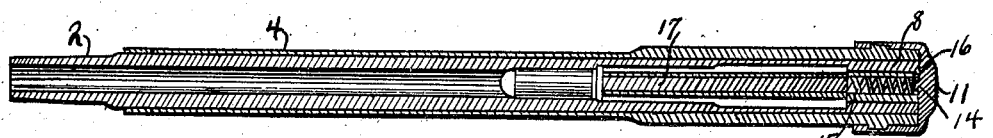
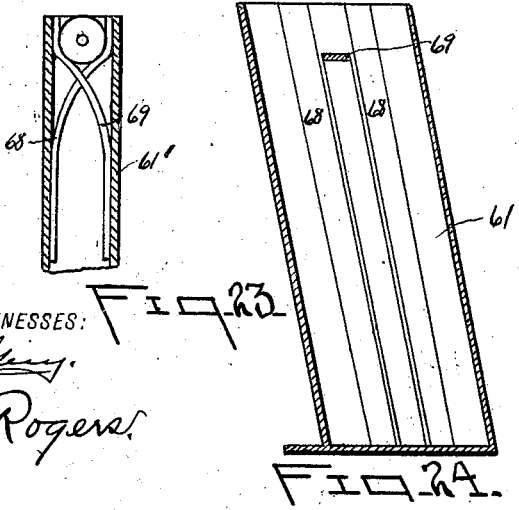

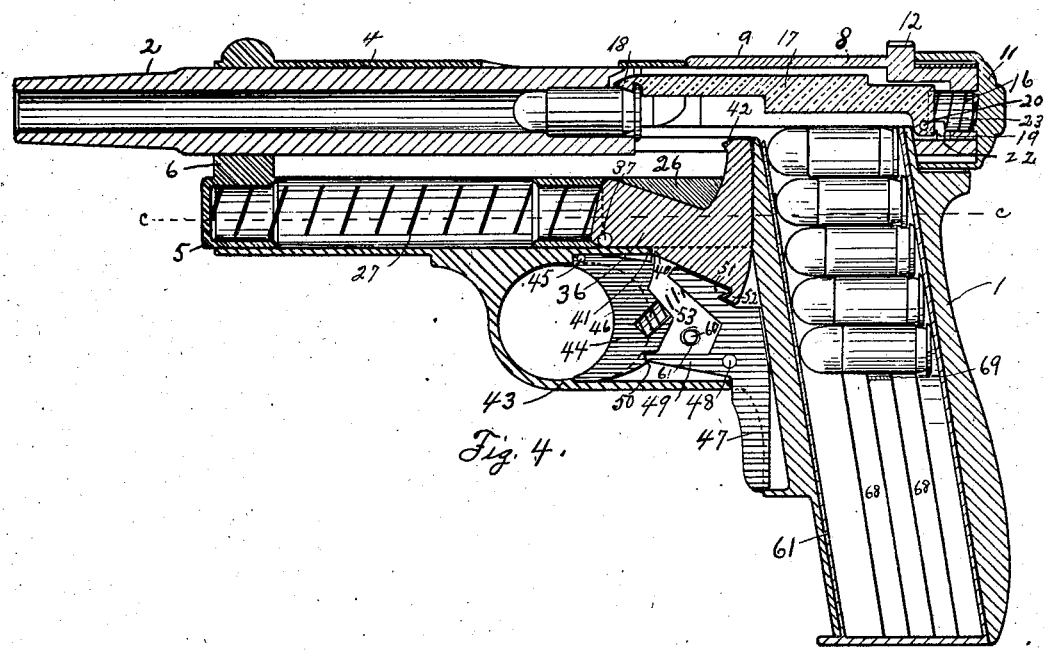
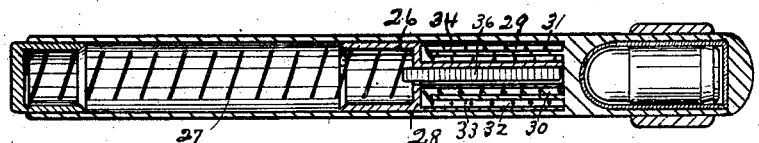
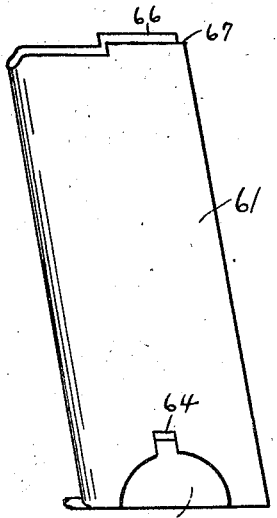

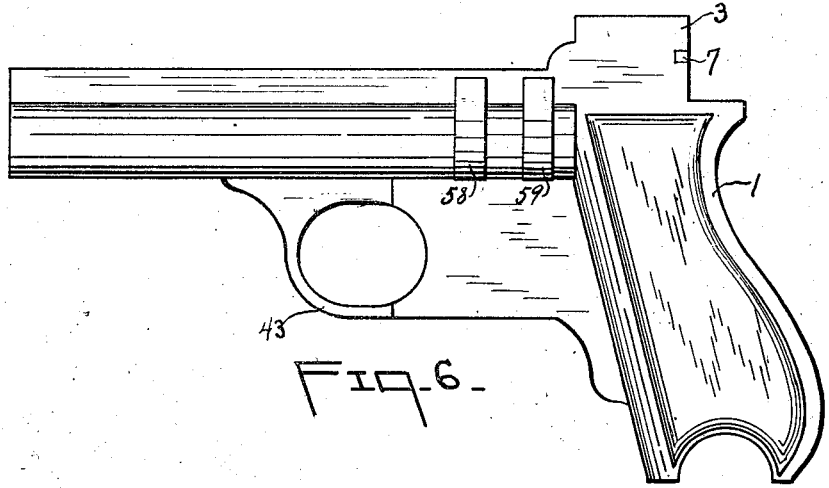
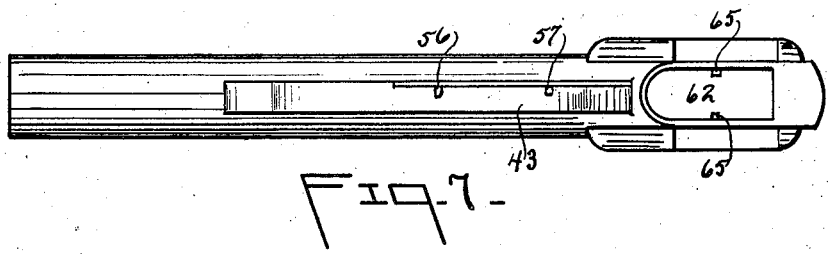
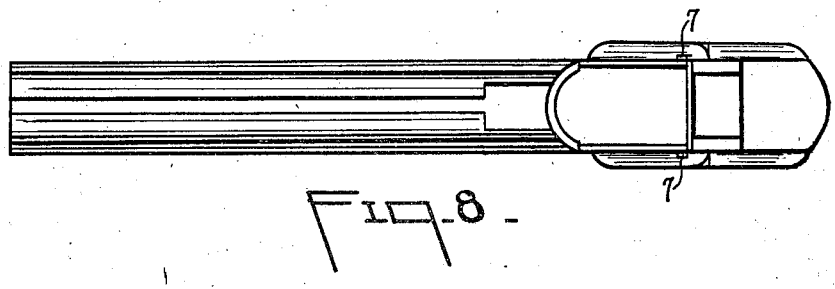

T. CONSENTINO.
FIREARM.
APPLICATION FILED MAR. 7, 1910.
987,672.
Patented Mar. 21, 1911.
4 SHEETS—SHEET 4.
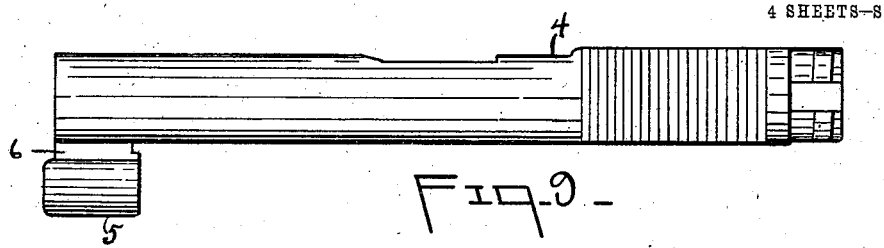
Fig. 9.
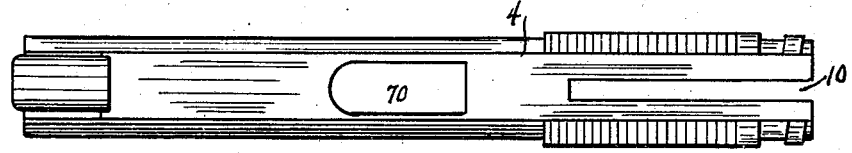
Fig. 10.
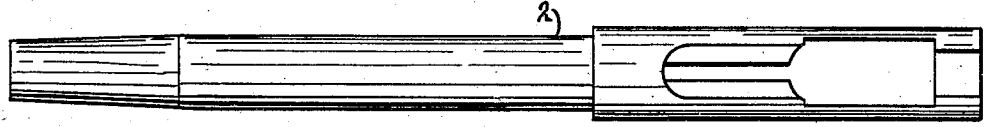
Fig. 11.
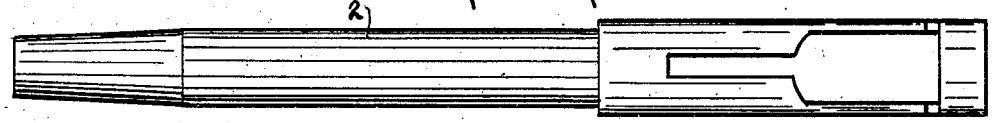
Fig. 12.
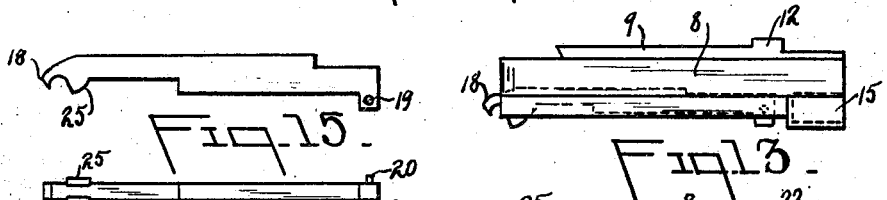
Fig. 15. Fig. 13.
Fig. 16. Fig. 14.
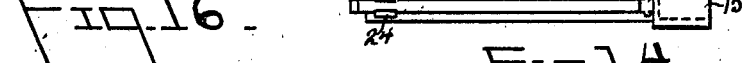
Fig. 21. Fig. 17. Fig. 20.
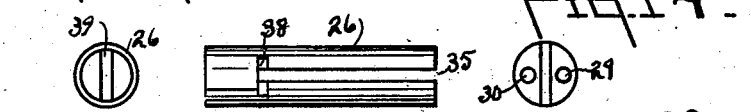
Fig. 18.
Fig. 19.
WITNESSES:
E. E. Glenny.
W. D. Rogers.
INVENTOR
Thomas Consentino
BY
Hardway & Cathey
ATTORNEY

UNITED STATES PATENT OFFICE.

THOMAS CONSENTINO, OF HOUSTON, TEXAS.

FIREARM.

987,672.

Specification of Letters Patent. Patented Mar. 21, 1911.

Application filed March 7, 1910. Serial No. 547,688.

*To all whom it may concern:*

Be it known that I, THOMAS CONSENTINO, a subject of the King of Italy, residing at Houston, in the county of Harris and State of Texas, have invented certain new and useful Improvements in Firearms, of which the following is a specification.

My invention relates to new and useful improvements in automatic firearms.

The object of the invention is to provide a device of the character described composed of few parts which may be easily taken apart and readily put together.

Another object of the invention is to provide a firearm which will eject the empty shell and replace a cartridge in position for firing automatically.

A further feature resides in the provision of means whereby the arm may be secured against accidental discharge.

A still further feature resides in the provision of a detachable magazine which will contain a large number of cartridges within a small compass.

With the above and other objects in view my invention has particular relation to certain novel features of construction, operation and arrangement of parts an example of which is given in this specification and illustrated in the accompanying drawings, wherein:

Figure 1 is a side elevation of my complete device. Fig. 2 is a plan view thereof. Fig. 3 is a sectional view thereof taken on the line *a—a* of Fig. 1. Fig. 4 is a sectional view thereof taken on the line *b—b* of Fig. 2. Fig. 5 is a sectional view taken on the line *c—c* of Fig. 4. Fig. 6 is a side elevation of the frame of the arm. Fig. 7 is a bottom view thereof. Fig. 8 is a top view of the same. Fig. 9 is a side elevation of the barrel casing. Fig. 10 is a bottom view thereof. Fig. 11 is a top view of the barrel. Fig. 12 is a bottom view thereof. Figs. 13 and 14 show, respectively, a side elevation and a bottom view of the breech-bolt. Figs. 15 and 16 show, respectively, a side and a bottom view of the shell extractor. Fig. 17 shows a bottom view of the hammer support. Fig. 18 shows a side elevation thereof. Fig. 19 shows a top view thereof. Figs. 20 and 21 show, respectively, the rear and forward ends thereof. Fig. 22 is a perspective view of the magazine. Fig. 23 is a partial sectional rear view thereof. Fig. 24 is a sectional side elevation thereof. Fig. 25 is a front elevation of the detachable thimble which is designed to engage over the rear end of the casing, and Fig. 26 is a view of the muzzle end of the arm.

Referring now more particularly to the drawings, wherein like numerals of reference designate similar parts in each of the figures, the numeral 1 refers to the framework of the arm upon which the barrel 2 is secured. This frame is composed of some suitable metal and comprises in the main a grip, barrel support and trigger guard and is provided with a suitable magazine chamber and is designed to support and protect the operative mechanism of the arm.

The barrel 2 is shown in detail in Figs. 11 and 12. Fig. 11 presents a top view thereof, showing the oblong aperture in the upper side thereof and Fig. 12 shows the under side thereof with an aperture terminating in an oblong forwardly extending slot, as shown.

The frame work is provided with two upwardly extending lugs 3 one on each side, which project up within the rear and enlarged portion of these apertures and secure the barrel in position on the frame work.

The numeral 4 refers to the casing which is designed to snugly embrace the barrel as shown. This casing is semi-cylindrical in shape and carries at its forward end a cup-shaped dependent 5 designed to slide within the cylindrical barrel support, as shown in Fig. 26. This dependent 5 is secured to the casing by neck 6 which slides in an oblong slot in the upper side of the barrel support, as shown in Fig. 26, and by this arrangement the casing is secured upon the framework and is permitted to slide longitudinally thereon. The free edges of the rear end of the casing engage over laterally extending lugs 7 carried upon either side of the framework and the rear end is thereby secured to the framework in such a manner as to be longitudinally slidable thereon.

The numeral 8 refers to a breech bolt which operates longitudinally in the rear end of barrel 2 and is secured to the casing so as to move as a unit therewith. The front end of this breech bolt normally rests against the cartridge shell and forms the abutting support therefor when the cartridge is exploded. The upper side of this breech bolt carries an oblong rib 9, which fits in the oblong slot 10 of the casing and the forward end of the rib is under cut, as shown in Fig. 13, and engages over the casing at the forward end of slot 10 and the thimble 11 engages over the rear end of casing 4 and abuts against shoulder 12 and thereby the breech bolt is securely held in place. This thimble is provided with a plurality of longitudinal inwardly extending ribs 13, Fig. 25, and the rear end of casing 4 has corresponding longitudinal grooves to receive the same. These ribs and the portions of the casing intermediate said grooves, are correspondingly threaded so that this thimble may be slid on the casing, the ribs of the one coinciding with the grooves of the other, and by a partial turn of the thimble the corresponding threads will be made to engage and the thimble will be firmly held upon the casing. Centrally located within the thimble is a forwardly extending stud 14 which projects into a cylindrical recess 15 in the rear end of the breech bolt. The stud serves as a stay for a coil spring 16 located within the recess 15. The rear free end of this spring engages in a niche in said stud and its forward end rests against the rear end of extractor 17 carried by the breech bolt. The forward free end of this spring is designed to engage against the side of the rear end of the extractor, Fig. 3, and by the torsion of said spring the thimble is normally held in engagement with the casing but is permitted to perform a partial turn when it is desired to remove the same therefrom. This extractor is shown in section Fig. 4 and in detail in Figs. 15 and 16. From an inspection of Fig. 4 it will be observed that this extractor is an oblong member provided with a hook 18 at its forward end designed to engage over the cartridge rim and also provided with a downwardly extending shoulder 19 at its rear end which carries laterally extending studs 20 and 21. These studs extend into the upwardly and forwardly extending slots 22 and 23 of the breech bolt and the extractor is securely held therein by the pressure of spring 16 and has a limited vertical movement in the oblong slot provided in the underside of the breech bolt for its reception. The spring 16 operates against the rear end of the extractor above its connection to the breech bolt and tends to depress the forward end thereof and secure its engagement over the cartridge rim.

The rear end of the extractor projects behind the studs 20 and 21 and extends up close to the upper side of the rear end of the slot receiving the extractor, so that the vertical play of the forward end of the extractor is limited by reason of the contact of the rear end thereof with the breech bolt. The extractor is also provided near its forward end, with two downwardly extending shoulders 24 and 25 for a purpose to be hereinafter set forth.

The numeral 26 refers to a tubular hammer support designed to rest in the rear end of the cylindrical barrel support the particular description and purpose of which will be hereinafter set forth in this specification.

The numeral 27 designates a coil spring which operates against the seat 28 within the hammer support and in resistance to the casing dependent 5, as shown in Figs. 4 and 5 and tends to normally hold the casing in its forward position, as shown in these figures and to restore it to that position when it has been forced back by the recoil or otherwise.

The hammer support 26 is provided with two tubular longitudinally extending recesses 29 and 30 for the reception of coil springs 31 and 32 which project from the hammer support and rest against the rear end of the barrel support and tend to drive the hammer support forward when the same is released to the operation thereof. Projecting from the rear end of the barrel support are two stays 33 and 34 around which these springs coil and by means of which their operation is rendered true. This member 26 is provided with an oblong vertically disposed slot 35 in which the hammer 36 is designed to play. This hammer is a flat member carrying at the forward end and near the lower side thereof, laterally extending studs 37 designed to operate in the transverse groove 38 and form a hinge connection between the hammer and its support.

The seat 28 is provided with a vertical slot 39, through which the front end of the hammer is forced to protrude when the hammer support is in its forward position, and the under side of the rear end of the barrel support has a longitudinal slot down through which the hammer extends thereby permitting a vertical and sliding movement thereof. The under side of the hammer declines rearwardly and is provided with a shoulder 40 designed to engage with the shoulder 41 of the barrel support when the hammer is in its retracted position. The rear portion of the hammer projects upwardly and terminates in a forwardly extending point 42 designed to contact with the cartridge primer and cause the discharge of the cartridge.

The numeral 43 refers to a trigger guard within which the trigger 44 operates. This trigger is pivoted to its guard by means of the stud 45 which protrudes from one side of the guard and through a hole in the trigger as shown in Fig. 4. The trigger carries an upwardly extending nib 46 which projects against the shoulder 40 of the hammer and forces the same out of engagement with shoulder 41, when the trigger is pressed and releases the hammer to the operation of springs, 31 and 32.

The numeral 47 refers to a safety trigger which is pivoted to the trigger guard by means of a stud 48, which projects from one side of the trigger guard and through a hole in said trigger 47. This trigger carries a forwardly extending finger, 49 which projects into a notch 50 in the rear side of trigger 44 and serves to lock the same against movement; and it is further provided with an upwardly extending catch 51 designed to engage with a corresponding catch 52, carried by the underside of the hammer to further secure the arm against accidental discharge. The upper side of trigger 44 is provided with a recess which serves as a seat for coil spring 53 which projects against catch 51 and secures the safety trigger in its engagement with trigger 44 and catch 52.

One of the side plates of the trigger guard is detachable as shown in Fig. 1. The lower edge of this plate carries downwardly extending lugs 54 and 55 which engage in the holes 56 and 57 in the bottom plate of the guard and the upper edge of said side plate carries upwardly extending straps 58 and 59 which fit into corresponding grooves in the barrel support and whose upper ends engage under the edge of casing 4. The immovable side plate of the trigger guard carries a stud 60 designed to serve as a stay for a coil spring 61 which is held against movement by the stud and projects against the detachable plate and serves to hold the same firmly in position.

In Fig. 22 I have shown in perspective the magazine 61; also shown in section in Figs. 23 and 24. This magazine is designed to occupy magazine chamber 62 within the arm grip and is provided on each side, at its lower end with a thumb spring 63 whose free end carries an outwardly extending catch 64 designed to engage over a corresponding shoulder 65 carried by the wall of the magazine chamber. By depressing these thumb springs the catch 64 may be disengaged from shoulder 65 and the magazine removed from the weapon.

The upper end of the magazine carries two flanges 66 and 67, one on each side, which have a slight inward inclination so as to engage with the cartridge and hold it in proper position to be engaged by the breechbolt in its forward movement, whereby it is forced into position for firing.

The magazine carries flat springs 68 and 69 located, respectively one each side thereof, and secured thereto at their lower ends. These springs intercross as shown in Fig. 23, and the cartridges rest therebetween as also shown in said figure and the pressure of said springs against the cartridges tend to elevate them and hold the upper one always in position to be engaged by the forwardly moving breech bolt.

In Fig. 4 I have shown the co-acting parts in position for discharge. A depression of safety trigger 47 will release finger 49 from notch 50 and at the same time disengage catches 51 and 52. A depression of the trigger 44 will then operate to elevate the nib 46 which will in turn disengage shoulder 40 from its engaging shoulder 41, and release the hammer support to the operation of springs 31 and 32. As this support is driven forward by the force of said springs the declining under side of the hammer slides over shoulder 41 and the hammer is thereby elevated through the slot in the underside of the barrel and the point 42 is driven against the primer of the cartridge and causes the discharge thereof. The force of the recoil operates against the breech bolt and drives the same together with the casing, rearwardly, at the same time, overcoming the resistance of spring 27. The extractor 17, in the recoil withdraws the empty shell which engages with the forward end of the upper cartridge at the instant the discharge opening 70, of the casing, coincides with the aperture in the upper side of the barrel 2, and the shell is ejected through said openings from the arm. The force of the recoil operating through the empty shell operates to drive the hammer support to its original position and as the rear end of said spring 27 rests against the forward end of the hammer, the rear end of said hammer is forced downward and it assumes the position shown in Fig. 4. The force of the recoil carries the breech bolt entirely to the rear of the magazine and having been spent, the casing and breech bolt are again carried forward by the operation of spring 27. As the breech bolt moves forward its forward end engages behind the next succeeding cartridge and brings the same into position for discharge.

It is to be observed that so long as there is a cartridge in the magazine the shoulders 24 and 25 of the extractor 17 are held elevated by said cartridge but when all of the cartridges are exhausted the extractor falls down, the said shoulders engage against the rear side of the magazine chamber and hold the casing in its retracted position. Warning is thereby given that the magazine is empty.

When it is desired to disassemble the weapon the thimble 11 may be removed and the casing withdrawn and each of the parts may then in turn, be removed with freedom and despatch.

A firearm constructed in accordance with the foregoing description and the drawings appended thereto, and made a part thereof, will be found to be comparatively simple and inexpensive in construction and effective, and precise in operation and will be free from all screws and rivets thus conducing to ease and despatch in assembling and disassembling the parts and providing against the inconvenience ordinarily incident to the removal and replacement of the same.

What I claim is:

1. A fire arm comprising a frame, a barrel adapted to be supported thereby, a casing fitting over said barrel and being secured to said frame in such a manner as to allow said casing longitudinal play on said frame, resilient means operating in resistance to said casing for holding the same in its normal position relative to the barrel and for restoring said normal position when the same is disturbed, a breech bolt disposed to operate longitudinally in said barrel and having connection with said casing in such a manner as to be operated thereby, an extractor carried by the breech bolt for engaging with the cartridge shell and ejecting the same through coinciding apertures provided in said barrel and casing, a hammer support disposed to operate longitudinally of the arm a hammer carried thereby, means for locking said hammer in a retracted position relative to its support, means for disengaging said locking means and means operating against the hammer support for advancing the same when said locking means are disengaged.

2. A fire arm comprising a frame, a barrel supported thereby, a casing fitting over said barrel and being secured to said frame in such a manner as to allow said casing longitudinal play on the frame, resilient means operating in resistance to said casing for holding the same in its normal position with relation to the barrel and for restoring said normal position when the same is disturbed a breech bolt operating within the barrel and actuated by the casing, a means for ejecting the shell from the arm, a magazine carried by the frame adapted to receive and retain cartridges, a means for transferring said cartridges from said magazine to the path of the breech bolt whereby they are forced into the barrel of said arm, a movable hammer support a hammer carried thereby, a means for locking said hammer in a retracted position relative to the said support, a means for releasing said locking means and a means for operating against said hammer support and forcing the same forward when said locking means is released.

3. In a fire arm a breech bolt, provided with a longitudinal slot therein, an extractor hingedly secured thereto, and operating within said slot, a catch carried by the forward end of the extractor and designed to engage over the rim of the cartridge shell, a means for depressing the said catch and securing its engagement with said rim, and means carried by said extractor for engaging with the magazine and locking said breech bolt in a retracted position relative to said chamber.

4. A fire arm as described comprising a frame, a barrel, supported thereby, a casing fitting over said barrel and being secured to said frame in such a manner as to allow said casing longitudinal play on said frame, resilient means operating in resistance to said casing for holding the same in its normal position with relation to the barrel and for restoring said normal position when the same is disturbed, a breech bolt operating within the barrel and actuated by the casing, a means carried by the breech bolt for ejecting the shell from the arm, a magazine adapted to receive and carried by the frame, a means carried by the magazine for transferring the cartridges therefrom into the path of the breech bolt, a hammer support, a hammer carried thereby, a means for locking the hammer in a retracted position relative to its support, means for releasing said locking means and a resilient mechanism operating against said hammer support for forcing the same forward when said locking means are released.

5. A fire arm comprising a frame, a barrel adapted to be supported thereby, a casing fitting over said barrel and being secured to said frame in such a manner as to allow said casing longitudinal play on said frame, resilient means operating in resistance to said casing for holding the same in its normal position relative to the barrel and for restoring said normal position when the same is disturbed, a breech bolt disposed to operate longitudinally in said barrel and having connection with said casing in such a manner as to be operated thereby, an extractor carried by the breech bolt for engaging with the cartridge shell and ejecting the same through coinciding apertures provided in said barrel and casing, a sliding hammer support disposed to operate longitudinally in the forepart of the arm, a hammer carried thereby, means for lowering said hammer, means for locking the same in a retracted position together with its support, means for disengaging said locking means, means for locking said disengaging means, means for disengaging said disengaging means, means operating against the hammer support for advancing the same when said locking means are disengaged and means for raising the hammer on its support when the same is advanced.

6. In a fire arm, the combination of the frame, the detachable barrel, the casing, the resilient means operating in resistance to the casing movement and the magazine carried by the frame, with the breech bolt carried by the casing, the extractor carried by said breech bolt, the sliding hammer support situated in the fore part of the arm, the resilient means operating in resistance thereto, the hammer carried thereby, the resilient means operating in resistance to the raising of said hammer, means for locking said hammer with support in a retracted position, means for disengaging said locking means, and means for raising the hammer after the same has been released.

7. A fire arm comprising a frame, a barrel supported thereby, a casing fitting over said barrel and being secured to said frame in such a manner as to allow said casing longitudinal play on the frame, resilient means operating in resistance to said casing for holding the same in its normal position with relation to the barrel and for restoring said normal position when the same is disturbed, a breech bolt operating within the barrel and actuated by the casing, a means for ejecting the shell from the arm, a magazine carried by the frame adapted to receive and retain cartridges, a means for transferring said cartridges from said magazine to the path of the breech bolt whereby they are forced into the barrel of said arm, a sliding hammer support in the fore part of the frame, a hammer carried thereby, a means for locking said hammer and support in a retracted position, a means for releasing said locking means, a means for operating against said hammer support and forcing the same forward with the hammer when said locking means is released and a means for raising the hammer when both the hammer and its support are advancing.

8. In a fire arm a breech bolt, provided with a longitudinal slot therein, an extractor hingedly secured thereto and operating within said slot, a catch carried by the forward end of the extractor and designed to engage over the rim of the cartridge shell, a means for depressing the said catch and securing its engagement with said rim, means carried by said extractor for engaging the same with a corresponding catch or shoulder on the back portion of the magazine chamber and for locking said breech bolt and casing in a retracted position when said casing slides back and means for disengaging said locking means from said catch or shoulder.

9. A fire arm as described comprising a frame, a barrel, supported thereby, a casing fitting over said barrel and being secured to said frame in such a manner as to allow said casing longitudinal play on said frame, resilient means operating in resistance to said casing for holding the same in its normal position with relation to the barrel and for restoring said normal position when the same is disturbed, a breech bolt operating within the barrel and actuated by the casing, a means carried by the breech bolt for ejecting the shell from the arm, a magazine carried by the frame, adapted to receive and retain cartridges, a means carried by the magazine for transferring the cartridges therefrom into the path of the breech bolt, a sliding hammer support, a hammer carried thereby, a means for locking the hammer and support in a retracted position, means for releasing said locking means and a resilient mechanism operating against said support for forcing the same forward when said locking means are released.

10. In a fire arm the combination of a frame, a barrel adapted to rest thereon, a casing sliding on the barrel and securing said barrel on the frame, a removable breech bolt carried by the casing, an extractor carried by the breech bolt, means for securing said sliding casing to said frame, resilient means operating against the backward movement of said casing, means for arresting said movement, means for locking said casing in its rearmost portion, means for releasing said locking means, a thimble designed to engage in the back of the casing for the fastening of the breech bolt to said casing and resilient means for securing the engagement of said thimble.

11. In a fire arm the combination of a frame, a casing adapted to slide on said frame, a barrel inside of the casing and engaging with the frame by which it is supported, means for securing the casing and barrel to said frame, a chamber in the frame for the reception of a cartridge magazine, means on both sides of said chamber for engaging corresponding shoulders or catches situated on both sides of said cartridge magazine, a semitubular chamber in front of the magazine chamber parallel to the barrel for the reception of one of the means attached to the casing by which the same is secured to the frame, a hammer support sliding inside of said semitubular chamber, a hammer hingedly secured thereon, resilient means operating between the means attached to the casing and said hammer support and hammer for depressing the latter, resilient means operating between the hammer support and frame for forcing forward the hammer support and hammer.

12. In a fire arm a frame comprising a chamber for the reception of a cartridge magazine, a semitubular chamber in front of said magazine chamber, a hammer support sliding inside of said semitubular chamber, a hammer hingedly secured thereon, means for forcing said hammer support and hammer to the rear of said chamber, means for depressing the hammer, means for locking the said hammer and its support to the rear of the chamber resilient means for throwing the same forward when released, means for raising said hammer, a trigger receptacle placed below said chamber, a removable side fitting thereon, means for locking said removable side to said receptacle, a trigger piece working inside of the same receptacle and adapted to release the hammer resilient means, adapted to hold the said trigger in its normal portion and restore it to the same whenever released after pulling, means for locking the said trigger and hammer in their normal position, and means for releasing said locking means.

In testimony whereof I have signed my name to this specification in the presence of two subscribing witnesses.

THOMAS CONSENTINO.

Witnesses:
J. W. YEAGLEY,
M. EMERY.

Copies of this patent may be obtained for five cents each, by addressing the "Commissioner of Patents, Washington, D. C."